United States Patent [19]
Bollinger

[11] Patent Number: 5,375,064
[45] Date of Patent: Dec. 20, 1994

[54] METHOD AND APPARATUS FOR MOVING A MATERIAL REMOVAL TOOL WITH LOW TOOL ACCELERATIONS

[75] Inventor: Lynn D. Bollinger, Ridgefield, Conn.

[73] Assignee: Hughes Aircraft Company, Los Angeles, Calif.

[21] Appl. No.: 162,510

[22] Filed: Dec. 2, 1993

[51] Int. Cl.$^5$ ............................................. G06F 15/46
[52] U.S. Cl. .................................. 364/474.3; 156/626; 156/643; 156/345; 204/298.32; 219/121.4; 219/121.41; 364/174
[58] Field of Search ................. 364/474.3, 563, 474.02, 364/500, 174; 156/625, 626, 643, 646, 345; 204/192.1, 192.13, 192.32, 192.37, 192.33, 298.32; 219/121.36, 121.4, 121.41, 121.54, 121.42; 318/571

[56] References Cited

U.S. PATENT DOCUMENTS

| | | | |
|---|---|---|---|
| 4,758,304 | 7/1988 | McNeil et al. | 156/626 |
| 4,877,479 | 10/1989 | McNeil et al. | 156/626 |
| 5,290,382 | 3/1984 | Zarowin et al. | 156/345 |
| 5,291,415 | 3/1994 | Zarowin et al. | 364/474.3 |

Primary Examiner—Joseph Ruggiero
Attorney, Agent, or Firm—M. E. Lachman; M. W. Sales; W. K. Denson-Low

[57] ABSTRACT

A stage 14 supporting a material removal tool 12 is instructed by a controller 16 through interface 18 to accelerate and decelerate the material removal tool 12 within at least one predetermined spatial interval while satisfying the dwell-time required to remove a predetermined amount of material to achieve a desired thickness of the spatial interval.

11 Claims, 3 Drawing Sheets

METHOD AND APPARATUS FOR MOVING A MATERIAL REMOVAL TOOL WITH LOW TOOL ACCELERATIONS

BACKGROUND OF THE INVENTION

1. Field of the Invention

The present invention generally relates to a method for moving a material removal tool over a substrate surface. More particularly, the present invention relates to a method of moving a small material removal tool, such as a plasma assisted chemical etching tool or mechanical polishing tool, so that material is removed from the surface of the substrate by moving the tool within predetermined spatial intervals with low tool acceleration within those intervals. The present invention provides a method for making an object having a predetermined final thickness profile from a substrate such as a silicon-on-insulator (SOI) wafer.

2. Description of the Prior Art

Substrate materials with thin solid layers, such as SOI wafers, and films are used extensively in the fabrication of electronic, optical, magnetic, superconducting and other important technological devices. For various reasons, such substrates are often subjected to figuring or thinning processes to remove some of the material from the surface. A method of computer controlled corrections by means of a plasma assisted chemical etching material removal tool to modify film thickness profiles of SOI wafers is disclosed in a U.S. patent application, Ser. No. 07/807,544, filed on Dec. 13, 1991, entitled "Method to Determine Tool Paths for Thinning and Correcting Errors in Thickness Profiles of Films", now U.S. Pat. No. 5,291,415, and is assigned to the assignee hereof. The disclosure therein is directed to a method for the development of a removal tool constant velocity versus removal tool position map from a removal tool dwell-time versus removal tool position map. The removal tool dwell-time versus position map provides information to relative motion hardware, such as a 5-axis position controller and stage, relating to the time the removal tool must spend over each of a plurality of predefined areas or spatial intervals of the surface of a wafer to remove a predetermined amount of material within each interval to achieve a desired thickness profile. In general, 5-axis position control hardware is required by most any method for material removal, including the constant velocity method, to follow an arbitrarily shaped surface. For applications in which the substrate to be corrected is nearly flat, such as thinning the silicon layer on an SOI structure or flattening silicon wafers, 2-axis motion is all that is needed. Common 2-axis motion configurations may be linear scan and step, "X-Y", and substrate table rotation with radial translation, "R-$\theta$". While the following discussion refers to X-Y motion, it applies equally well to other motion configurations such that it relates to executing the dwell-time map regardless of the configuration of the position control hardware.

Under the constant velocity method in general, the removal tool is moved over each predefined spatial interval at a constant velocity such that the time the tool spends over that predefined spatial interval corresponds to a dwell-time calculated for that interval. However, the constant velocity method for moving a material removal tool has drawbacks in that the stage must be able to provide very rapid acceleration or deceleration between each adjacent spatial interval in order to provide nearly constant velocity within each spatial interval. In other words, the changes in the constant velocity between spatial intervals must occur in a very short period of time so that the velocity of the removal tool is nearly constant within substantially all of the spatial interval. Unfortunately, the maximum acceleration or deceleration of the stage ultimately limits the ability to accurately alter the SOI to a desired thickness profile under the constant velocity method. The acceleration of the tool with respect to the substrate is a function of the average tool velocity and the change in dwell-time between adjacent spatial intervals. In practice, a production application requiring rapid correction of parts (e.g., thickness of silicon in a SOI structure, flattening of silicon wafers) would require a high tool velocity and, consequently, very high accelerations if the dwell-time map is executed by the constant velocity method. Furthermore, such accelerations may not be practical with ordinary motion control hardware because the demand of rapid acceleration and deceleration may adversely effect its lifetime, reliability and cost. In some cases the demands may be so great as to require very expensive, specialized, massive control hardware.

Thus, the present invention is directed toward a method to overcome the shortcomings of material removal from the surface of a substrate that are associated with the constant velocity method for moving a material removal tool by providing a method that allows for a minimized acceleration of the stage within a spatial interval that satisfies the dwell-time requirements for that spatial interval.

SUMMARY OF THE INVENTION

The present invention contemplates a method for moving a material removal tool over a substrate surface to remove material from the surface to achieve a predetermined thickness profile for the substrate, wherein the above-mentioned problems and shortcomings of the prior an are overcome. The method of the present invention achieves the predetermined thickness layer profile by providing acceleration and deceleration instructions to a relative motion hardware controller that accelerates and decelerates the relative motion hardware and material removal tool over the substrate surface.

According to the method of the present invention, a thickness profile of the substrate is measured to construct a thickness profile map for the substrate along at least a portion of the surface. The measured thickness profile map is then compared to a desired thickness profile for the substrate and a determination is subsequently made to determine whether the measured thickness profile matches the desired thickness profile within a predetermined tolerance. When the measured thickness profile does not match the desired thickness profile within a predetermined tolerance, the method of the present invention then determines a series of material removal tool dwell-times versus material removal tool positions that will achieve the desired thickness profile and accordingly the method forms a corresponding dwell-time map. From the dwell-time map, the method of the present invention then determines a series of accelerations and decelerations for the material removal tool that will satisfy the series of dwell-times contained in the dwell-time map to form an acceleration map. Finally, the relative motion controller accelerates and decelerates the relative motion hardware and material removal tool over the substrate surface according to the acceleration map to remove material from the surface. If desired, after material has been removed from the surface of the substrate, the thickness profile may be measured and compared again with the predetermined thickness profile. Accordingly, the method of the present invention may be repeated until the desired profile is achieved.

One objective of the present invention is to provide a method for moving a material removal tool such as a plasma assisted chemical etching apparatus to remove material from the surface of a substrate to achieve a predetermined thickness profile for that substrate.

Other objects and advantages of the present invention will become apparent to those skilled in the art from the following detailed description read in conjunction with the attached drawings and claims appended hereto.

BRIEF DESCRIPTION OF THE DRAWINGS

The drawings, not drawn to scale, include.

DETAILED DESCRIPTION OF THE INVENTION

Figure 1:
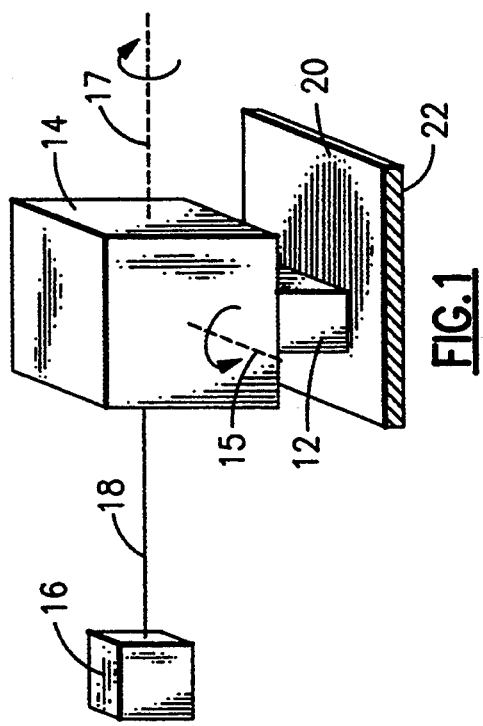
FIG. 1 is a perpective schematic diagram of a material removal tool attached to a position and motion stage and controller used to modify the surface profile or thickness of a substrate by movement of the tool over the surface of the substrate according to instructions received from the controller.

Referring to FIG. 1, a schematic diagram of a material removal system 10 is shown. The system 10 includes a material removal tool 12 attached to a multi-axis relative motion device 14 capable of linear movement in the X, Y and Z directions as well as rotation about the X axis 15 and Y axis 17. The stage 14 is driven by a controller 16 through interface 18. Any well known tool for removing material such as a mechanical polisher or plasma assisted chemical etching apparatus may be used as the material removal tool 12 for the purposes of practicing the method of the present invention. Commercially available stages may be used as the relative motion device 14, and commercially available multi-axis controllers for providing instructions to the stage, for example a computer with a multi-axis control board, may be used as the controller 16. For the purposes of the present invention, the motion of the stage 14 is described as linear motion in the X and Y planes.

In FIG. 1, the system 10 is shown above a substrate 22 having a surface 20 facing the removal tool 12. Material is removed from the surface 20 by moving the material removal tool 12 over the surface 20 with the stage 14. The precise movement of the stage 14 and attached material removal tool 12 is directed by controller 16 through interface 18 according to a predetermined route or map.

In an alternative embodiment (not shown), the material removal tool 12 may be fixed in space and the substrate 22 may be positioned on the stage 14. In the alternative embodiment, material removal is effected by moving the stage 14 supporting the substrate 22 such that the substrate surface 20 is controllably moved under the material removal tool 14 as directed by the controller 16 through the interface 18. Similarly, the relative substrate to tool motion may be obtained by a combination of tool and substrate motion.

Figure 2:
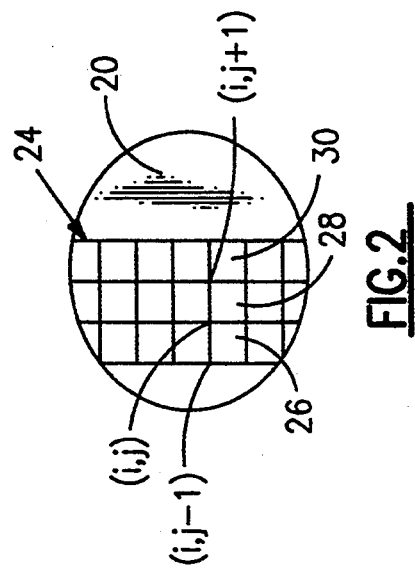
FIG. 2 is a elevational view of the surface having blocks drawn thereon to illustrate the boundaries of a plurality of adjacent spatial intervals on the surface.

Referring to FIG. 2, according to the prior art methods and the present method, the entire substrate surface 22 is divided into an array or plurality of spatial intervals 24. The spatial intervals 24 can be identified by the coordinates i and j. For example, a first spatial interval 26 may be identified by the coordinates i and j−1, a second spatial interval 28 may be identified by the coordinates i and j and a third spatial interval 30 may be identified by the coordinates i, j+1. While FIG. 2 shows the substrate divided into a rectangular grid of spatial intervals as would apply to X-Y scanning motion of the tool over the substrate, other substrate divisions resulting in different spatial interval configurations could be used. For example, intervals radially symmetric about the substrate center, could be used with relative tool motion provided by substrate rotation and radial translation.

Figure 3:
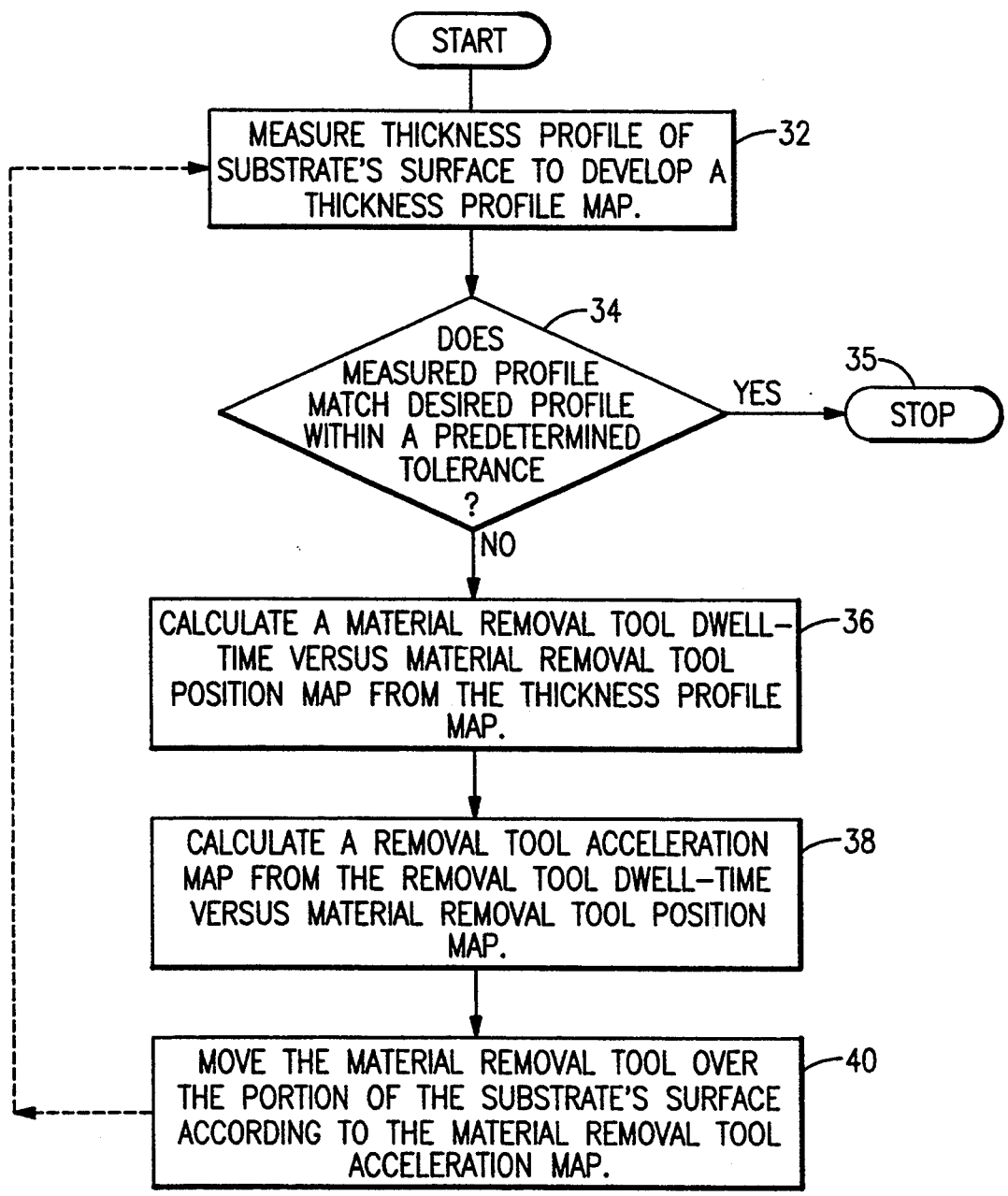
FIG. 3 is a flow diagram of the steps of the method of the present invention for moving the material removal tool.

Referring to FIG. 3, material removal from the substrate surface 20 begins with a measuring step 32, where the thickness profile of the substrate 22 is measured along the substrate surface 20 to develop a thickness profile map. The measurement of the thickness or the surface profile of the substrate 22 may be carried out by any well known methods suitable to the material being measured.

The measurement step 32 is followed by a comparison step 34. The comparison step 34 compares the measured thickness profile with a predetermined or desired thickness profile to determine whether any material needs to be removed from the substrate surface 20. The comparison of the measured thickness profile with a desired thickness profile can be carried out by comparing the two profiles with a computer. If the comparison step 34 determines that the measured profile matches the desired profile within a predetermined tolerance, the method of the present invention is terminated as shown in block 35. However, if the measured thickness profile does not match the desired profile within a predetermined tolerance, the method of the present invention proceeds to a dwell-time calculation step 36.

In the method of the present invention as well as in the prior art, a dwell-time for each of the plurality of spatial intervals 24 must be determined for at least a portion of the substrate surface 20 so as to build a dwell-time map for the substrate surface 20 that will result in a desired thickness or profile after the material removal tool 12 has been moved over that portion of the substrate surface 20. The dwell-time for a spatial interval, T(i,j), is defined as the time the material removal tool 12 must spend in that spatial interval to remove an amount of material from the spatial interval that will result in a desired thickness profile within the spatial interval. The dwell-time for any spatial interval is directly proportional to the material removal rate of the material removal tool 12. Performance of the dwell-time calculation step 36 results in a material removal tool dwell-time versus material removal tool position map.

Figure 4:
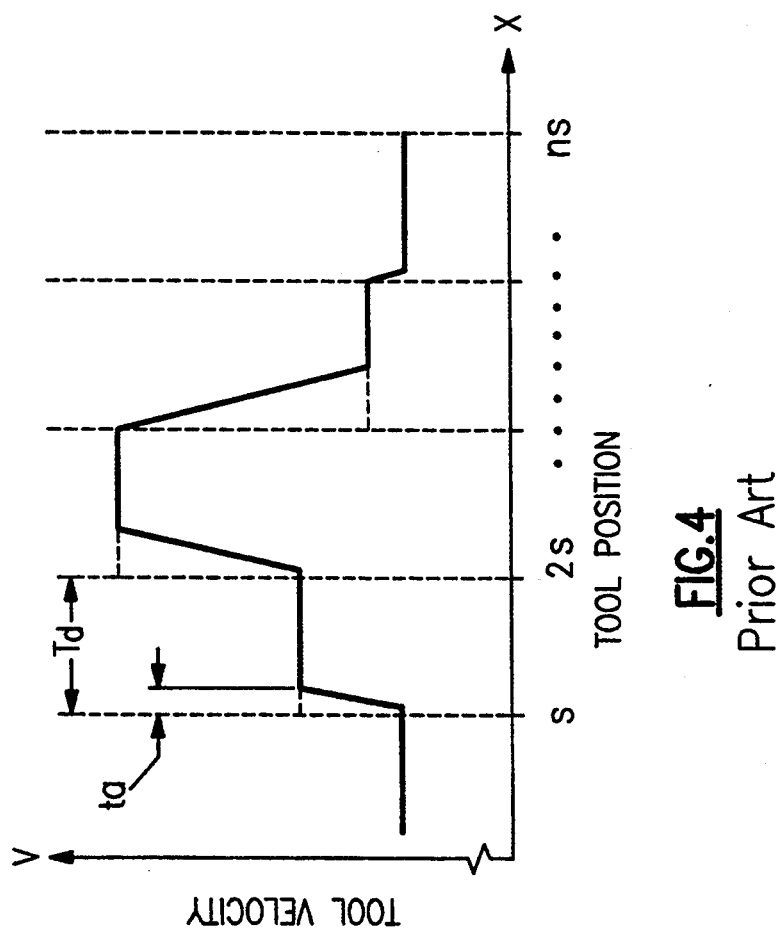
FIG. 4 is a graphical illustration of the material removal tool velocity versus the tool's position under the prior art constant velocity method where a change in the tool's velocity is permitted only between spatial intervals.

Under the prior art constant velocity method, the dwell-time calculation step 36 was followed by a constant velocity calculation step (not shown). The constant velocity calculation step calculated the velocity of the material removal tool 12 for each of the plurality of spatial intervals 24 required to meet the dwell-time requirements for each of the plurality of spatial intervals 24. Once the constant velocity of the removal tool was calculated for each spatial interval, the removal tool 12 was moved with a constant velocity within a spatial interval and the velocity was changed only upon entering a new spatial interval. For example, the velocity of the material removal tool in the first spatial interval 26 was held constant while the material removal tool moved through the first spatial interval 26. As soon as the material removal tool 12 crossed into the second spatial interval 28 the velocity of the material removal tool was changed. FIG. 4 graphically illustrates the removal tool's substantially constant velocity versus the tool's position from one spatial interval to the next spatial interval as denoted by the letters s, 2s and so on. As FIG. 4 shows, extreme changes in velocity at the beginning of the spatial interval resulted from the use of the constant velocity method. This extreme change in velocity placed great demands on the performance stage 14 resulting in wear and tear on the stage or requiting a very expensive stage 14 to effectively and accurately remove material from the surface of the substrate.

The method of the present invention overcomes the problems associated with the extreme change in velocity when using the constant velocity method by including a removal tool acceleration calculation step 38. The removal tool acceleration calculation step 38 develops an acceleration map comprising a series of removal tool linear acceleration values for each of the plurality of spatial intervals. The present invention contemplates calculating the series of linear accelerations with the condition that the linear acceleration of the removal tool 12 and the stage 14 within each of the plurality of spatial intervals is minimized and that the dwell-time for that interval is met. To obtain a well behaved dwell-time map, the calculated accelerations should be dependent only on the dwell-times of the neighboring spatial intervals, preferably on that specific dwell-time spatial interval T(i,j) and the immediately adjacent dwell-time intervals T(i,j−1) and T(i,j+1). Otherwise, the acceleration for any given interval would depend on the dwell-times for many other and distant intervals making the calculation unwieldy, and difficult to minimize the relative accelerations of the tool. Thus, according to the present invention this condition assures that the movement of the X-Y-Z stage 14 can be controlled by controller 16 by following a unique acceleration map that is calculated from the dwell-time map. The acceleration map calculated by step 38 also allows for evaluation of the velocities and accelerations required for specific intervals.

As well as calculating the acceleration map for spatial intervals, the acceleration map calculated by step 38 also allows for determining an acceleration map for tool motion over specific time intervals. In this mode, the controller 16 drives the stage 14 at the calculated accelerations for a specified time interval in such a matter as to execute the dwell-time map. Since the common method of stage control is based on sensing stage position such as rotary or linear encoder, the preferred acceleration map would be one based on spatial intervals.

It is contemplated that the conditions placed on the calculation of the acceleration map can be satisfied by making a time specified change or a position specified change in acceleration of the material removal tool within an interval. In either situation, according to the method of the present invention, the condition on tool velocity and position is applied to movement of the material removal tool 12 and the stage 14 such that (1) the tool velocity is determined at a specified time or position in each interval; and (2) the magnitude of the tool velocity at this point is "localized" to a dependence on the dwell-times of that interval, or, that interval and the immediately adjoining intervals. A straight forward application to this is: (1) determine the tool velocity for the end point of each interval; and (2) specify the magnitude of the tool velocity at this point (i.e., the end of the interval), $V_f(i,j)$ as:

$$V_f(i,j) = s/T(i,j).$$

As those skilled in the art will now appreciate, velocity $V_f(i,j)$ has the same value as the constant velocity for the entire interval that would meet the dwell-time T(i,j) for that interval. Other conditions that tie the tool velocity to the local dwell-times (e.g., $V_f(i,j) = s/T(i,j)$ at the mid-point of the interval) may be used.

According to the method of the present invention, the acceleration map calculation step 38 develops an acceleration map by calculating a series of linear accelerations. This series of linear accelerations eventually become commands to the controller 16 for moving the material removal tool 12 and stage 14. These accelerations may be calculated by a method such that the linear accelerations of the removal tool are changed at a specific time within an interval. Alternatively, according to the present invention, the series of linear acceleration may be calculated such that the linear accelerations of the removal tool are changed at a specific position within the interval. Under either calculation method, two linear accelerations, $A_1(i,j)$ and $A_2(i,j)$, result for each spatial interval that satisfy the previously identified condition that the acceleration of the stage within the interval T(i,j) be minimized.

Figure 5:
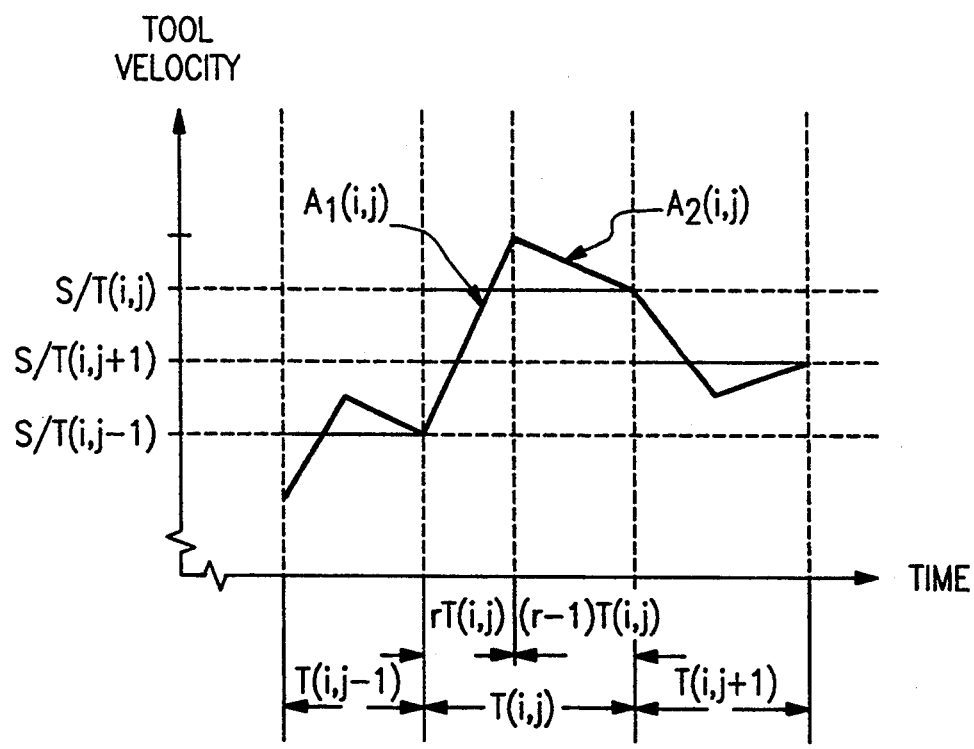
FIG. 5 is a graphical illustration of the material removal tool velocity versus time where the removal tool is instructed to change acceleration at a specific time within a spatial interval as well as meet a previously calculated dwell-time for that spatial interval.

FIG. 5 illustrates the results achieved when the material removal tool 12 and stage 14 is moved according to a time specified change in acceleration and localized velocity condition $V_f(i,j) = S/T(i,J)$. Under the time specified change in acceleration, the removal tool spends time T(i,j) in traversing an interval corresponding to position (i,j) by linearly accelerating for a period of time defined as r T(i,j), where r is less than 1, and then accelerating at a different linear acceleration for time $(1−r) T(i,j)$. Thus, the two linear accelerations, $A_1(i,j)$ and $A_2(i,j)$ that yield dwell-time T(i,j) are:

$$A_1(i,j) = [s/T(i,j)][1/T(i,j) - 1/T(i,j-1)](1+r)/r; \text{ and}$$

$$A_2(i,j) = -[s/T(i,j)][1/T(i,j) - 1/T(i,j-1)]r/(1-r).$$

$A_1(i,j)$ and $A_2(i,j)$ are minimized when $r=(\frac{1}{2})^{\frac{1}{2}}$ or 0.7071. $T(i,j)$ is the dwell-time calculated for the interval corresponding to the point i,j and $T(i,j-1)$ is the dwell-time for the previous interval i,j−1, s is the scan interval length and r is an operator set variable that gives the fraction of time for which the tool accelerates at $A_1(i,j)$ in scan interval lengths. According to the present invention, material may be removed from the surface by instructing the stage controller to accelerate the stage for according to $A_1(i,j)$ for a period of time equal to r $(T(i,j))$ followed by $A_2(i,j)$ for a period of time equal to $(1-r)$ $(T(i,j))$.

Figure 6:
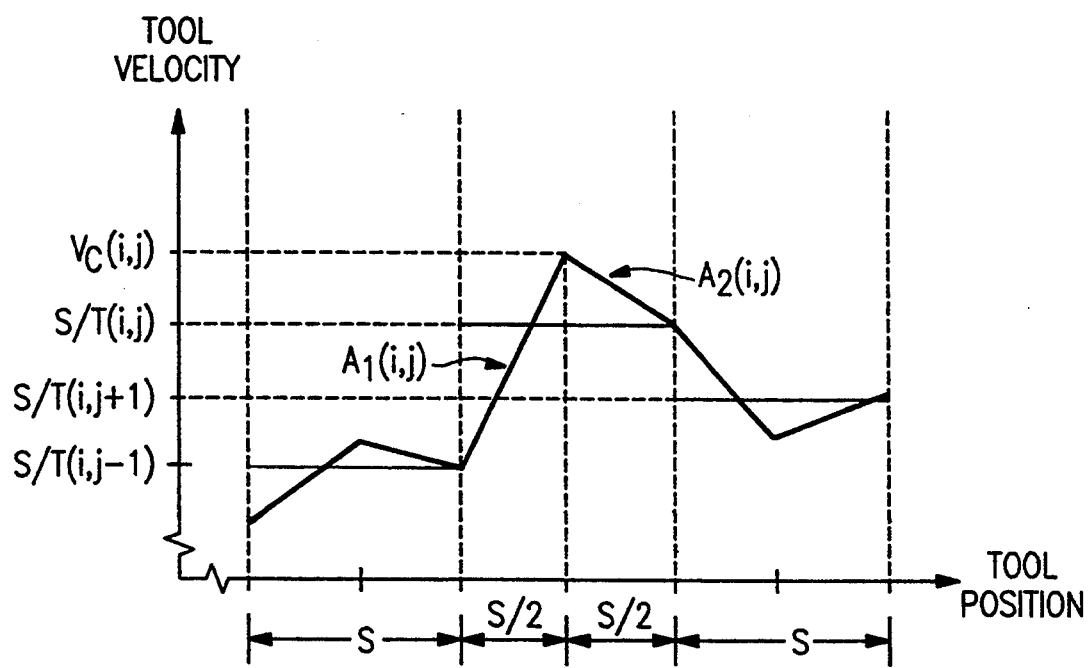
FIG. 6 is a graphical illustration of the material removal tool velocity versus the tool's position where the removal tool is instructed to change acceleration at a specific position within a spatial interval as well as meet a previously calculated dwell-time for that spatial interval.

FIG. 6 illustrates the results achieved when the material removal tool 12 and stage 14 is moved according to a position specified change in acceleration. Under this method, the removal tool accelerates at one linear acceleration for half the interval length, s/2, and then accelerates at a second linear acceleration for the second half of the interval length, s/2). The total time the tool spends in the interval i,j is again represented as $T(i,j)$. The two linear accelerations, $A_1(i,j)$ and $A_2(i,j)$ for scan interval corresponding to point (i,j) are:

$$A_1(i,j)=[V_c(i,j)/s-1/T(i,j-1)]^2;$$

$$A_2(i,j)=[1/T(i,j)-V_c(i,j)/s]^2; \text{ and}$$

$$V_c(i,j)=s/2\{1/T(i,j)-1/T(i,j-1)+[(1/T(i,j)-1/T(i,j-1))^2+4/(T(i,j))^2]^{\frac{1}{2}}\}.$$

$T(i,j)$ and $T(i,j-1)$ are the dwell-times for adjacent positions on the substrate surface, s is the interval length over which the dwell-times are calculated and $V_c$ is the velocity the tool accelerates at the mid-point of the interval $T(i,j)$. Tool velocities for the start and completion of the interval, $V_s(i,j)$ and $V_f(i,j)$, are determined by:

$$V_s(i,j)=V_f(i,j-1)=s/T(i,j-1) \text{ and } Vf(i,j)=s/T(i,j).$$

Under this alternative method, stage controller commands can be given in terms of linear accelerations from point to point where each point is separated by s/2 or the commands can be given in terms of specified velocities $V_s(i,j)$, $V_c(i,j)$ and $V_f(i,j)$ at succeeding positions separated by s/2 where the tool moves with linear acceleration to the specified velocity at the specified position.

Although the present invention has been described with respect to one or more particular embodiments of the method, it will be understood that other method steps may be performed without departing from the spirit and scope of the present invention. Hence, the present invention is deemed limited only by the appended claims and the reasonable interpretation thereof.

What is claimed is:

1. A method for moving a material removal tool over the surface of a substrate to remove material from the substrate, said method comprising the steps of:
   measuring the initial thickness profile of at least a portion of the surface of the substrate to develop a thickness profile map for at least a portion of the substrate;
   determining a material removal tool dwell-time versus material removal tool position map based on the initial thickness profile map for the surface of the substrate that will result in a final predetermined thickness profile for the surface of the substrate;
   calculating a removal tool acceleration map for the surface of the substrate based upon the removal tool dwell-time versus material removal tool position map; and
   moving the material removal tool according to the material removal tool acceleration map so as to remove a predetermined amount of material from the surface of the substrate to achieve the desired substrate surface profile according to the final predetermined thickness profile.

2. A method for moving a material removal tool over the surface of a substrate to remove material from the substrate, said method comprising the steps of:
   dividing the surface of the substrate into at least one spatial interval;
   measuring the thickness of said at least one spatial interval;
   comparing the measured thickness of said at least one spatial interval with a desired thickness for said at least one spatial interval;
   determining an amount of material to be removed from said at least one spatial interval that will result in a desired thickness for said spatial interval;
   calculating a material removal tool dwell-time for said at least one spatial interval that will remove material from said at least one spatial interval to achieve the desired thickness for each spatial interval;
   calculating a series of removal tool accelerations for said at least one spatial interval that will allow the material removal tool to remain in each of the plurality of spatial intervals for a period of time corresponding to the calculated dwell-time for said at least one spatial interval; and
   moving the material removal tool relative to the surface of the substrate with acceleration and deceleration within said at least one spatial interval according to the series of removal tool accelerations calculated for said at least one spatial interval.

3. The method of claim 2, wherein the series of removal tool accelerations is calculated so as to make the acceleration of the removal tool time dependent.

4. The method of claim 2, wherein the series of removal tool accelerations is calculated so as to make the acceleration of the removal tool position dependent.

5. A method for moving a material removal tool over the surface of a substrate to remove material from the substrate, said method comprising the steps of:
   dividing the surface of the substrate into a plurality of spatial intervals;
   measuring the thickness of each of the plurality of spatial intervals;
   comparing the measured thickness of each of the plurality of spatial intervals with a desired thickness for each of the plurality of spatial intervals;
   determining an amount of material to be removed from each of the plurality of spatial intervals that will result in a desired thickness for each of the plurality of spatial intervals;
   calculating a material removal tool dwell-time for each of the plurality of spatial intervals that will remove material from each of the plurality of spatial intervals to achieve the desired thickness for each of the plurality of spatial intervals;
   calculating a series of removal tool accelerations for each of the plurality of spatial intervals that will allow the material removal tool to remain in each of the plurality of spatial intervals for a period of time corresponding to the calculated dwell-time for each of the plurality of the spatial intervals; and moving the material removal tool relative to the surface of the substrate with acceleration and deceleration within each of the plurality of spatial intervals according to the series of removal tool accelerations calculated for each of the plurality of spatial intervals.

6. The method of claim 5, wherein the series of removal tool accelerations for each of the plurality of spatial intervals is calculated so as to make the acceleration of the removal tool within each of the plurality of spatial intervals time dependent.

7. The method of claim 5, wherein the series of removal tool accelerations for each of the plurality of spatial intervals is calculated so as to make the acceleration of the removal tool within each of the plurality of spatial intervals position dependent.

8. An apparatus for moving a material removal tool over the surface of a substrate to remove material from the substrate, said apparatus comprising:

means for dividing the surface of the substrate into at least one spatial interval;

means for measuring the thickness of said at least one spatial interval;

means for comparing the measured thickness of said at least one spatial interval with a desired thickness for said at least one spatial interval;

means for determining an amount of material to be removed from said at least one spatial interval that will result in a desired thickness for said spatial interval;

means for calculating a material removal tool dwell-time for said at least one spatial interval that will remove material from said at least one spatial interval to achieve the desired thickness for each spatial interval;

means for calculating a series of removal tool accelerations for said at least one spatial interval that will allow the material removal tool to remain in each of the plurality of spatial for a period of time corresponding to the calculated dwell-time for said at least one spatial interval; and means for moving the material removal tool relative to the surface of the substrate with acceleration and deceleration within said at least one spatial interval according to the series of removal tool accelerations calculated for said at least one spatial interval.

9. The apparatus of claim 8, wherein the means for moving the material removal tool is a 5-axis stage.

10. The apparatus of claim 8, wherein the means for calculating a series of removal tool accelerations further comprises a means for making the series of removal tool accelerations time dependent.

11. The apparatus of claim 8, wherein the means for calculating a series of removal tool accelerations further comprises a means for making the series of removal tool accelerations position dependent.

* * * * *